US006346570B1

(12) United States Patent
Kazuyuki et al.

(10) Patent No.: US 6,346,570 B1
(45) Date of Patent: Feb. 12, 2002

(54) WATER RESISTANT COMPOSITION, COATING AGENT, AND RECORDING MATERIAL

(75) Inventors: Somemiya Kazuyuki; Sadahiko Shiraga; Naoki Fujuwara; Atsushi Jikihara; Toshiyuki Akasawa, all of Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/642,910

(22) Filed: Aug. 22, 2000

(30) Foreign Application Priority Data

Aug. 30, 1999 (JP) .......................................... 11-242535
Aug. 31, 1999 (JP) .......................................... 11-245184

(51) Int. Cl.$^{7}$ .................................................. C08J 3/10

(52) U.S. Cl. ....................... 524/783; 430/139; 430/440; 430/446; 430/909; 428/467; 524/139; 524/803; 525/59; 525/60; 525/61

(58) Field of Search ................................ 524/398, 783, 524/803; 430/139, 440, 446, 909; 525/59, 60, 61; 428/341, 195, 342, 411.1, 211, 467

(56) References Cited

U.S. PATENT DOCUMENTS 2,938,812 A * 5/1960 Marzocchi et al.
3,318,856 A * 5/1967 Deyrup et al.
3,839,307 A * 10/1974 Schmifg ...................... 525/60
3,922,445 A * 11/1975 Mizuno et al.
3,959,242 A * 5/1976 Watts et al. ................... 526/9
4,012,352 A * 3/1977 Deyrup ........................ 525/60
4,016,129 A * 4/1977 Miyosawa ................. 260/29.6
4,097,436 A * 6/1978 Buning et al. .............. 524/803
4,219,591 A * 8/1980 Buning et al.
4,271,224 A * 6/1981 Mizuno et al. ............. 428/207
4,276,389 A * 6/1981 Wieder et al. ................ 525/61
4,567,221 A * 1/1986 Maruyama et al.
4,654,294 A * 3/1987 Sato et al. .................. 430/909
4,704,416 A * 11/1987 Eck et al. ................... 525/103
4,937,284 A * 6/1990 Bergström ................... 525/59
5,354,803 A * 10/1994 Dragner et al.
5,496,634 A * 3/1996 Ogawa et al.
5,641,563 A * 6/1997 Truong et al.
6,001,903 A * 12/1999 Nakamae et al. ........... 524/503
6,069,200 A * 5/2000 Chen et al.

FOREIGN PATENT DOCUMENTS

JP 49-94768 9/1974
JP 8-283682 10/1996
JP 9-240146 9/1997

OTHER PUBLICATIONS

U.S. application No. 09/452,189, filed Dec. 2, 1999, pending.

U.S. application No. 09/642,910, filed Aug. 22, 2000, pending.

* cited by examiner

*Primary Examiner*—Veronica P. Hoke
(74) *Attorney, Agent, or Firm*—Oblon, Spivak, McClelland, Maier & Neustadt, P.C.

(57) ABSTRACT

Provided are a water resistant composition comprising a uniform mixture of (A) at least one of modified polyvinyl alcohol containing either from 1 to 20 mol % of $\alpha$-olefin units with not more than 4 carbon atoms, from 0.01 to 1 mol % of silyl groups, or from 1 to 20 mol % of $\alpha$-olefin units with not more than 4 carbon atoms and from 0.01 to 1 mol % of silyl groups and (B) an organotitanium compound having a chelating ligand, in a blend ratio of component (A) to the component (B) between 99.99/0.01 and 60/40 by weight; a coating agent comprising the composition; a thermal recording material having a coat layer of the composition; and an ink-jet recording material having an ink-absorbing layer of the composition.

11 Claims, No Drawings

WATER RESISTANT COMPOSITION, COATING AGENT, AND RECORDING MATERIAL

BACKGROUND OF THE INVENTION

1. Field of the Invention

The present invention relates to a highly water resistant composition that comprises a specific modified polyvinyl alcohol and an organotitanium compound having a chelating ligand, and to a coating agent and a recording material such as a thermal recording material, an ink-jet recording material, etc.

2. Description of the Related Art

Heretofore, a polyvinyl alcohol (hereinafter referred to as PVA) is widely used for various binders, adhesives and surface-treating agents. It is known that PVA has excellent properties of film formability and mechanical strength and is far better than any other water-soluble resins. However, as being soluble in water, PVA is problematic in that its water resistance, especially when dried at low temperatures is poor. To solve the problem, various methods have heretofore been investigated. For example, one method known in the art comprises crosslinking PVA with any of glyoxal, glutaraldehyde, dialdehyde starch, water-soluble epoxy compounds, methylol compounds, etc. However, the method requires high-temperature long-time heat treatment at 100° C. or higher, often at 120° C. or higher, to ensure PVA of satisfactory water resistance. For obtaining PVA which could be still water resistant even when dried at low temperatures, known is a method of processing PVA under a strong acidic condition, for example, at pH of not higher than 2. However, PVA obtained in the method is problematic in that the viscosity of its aqueous solution is unstable and the solution often gels while handled, and that its water resistance is unsatisfactory. Another problem with the method is that PVA processed under such a severe condition is discolored and the appearance of its film is poor. Further known are a method of crosslinking a carboxyl group-having PVA with a polyamidoepichlorohydrin resin; and a method of crosslinking an acetoacetyl group-having PVA with a polyaldehyde compound such as glyoxal or the like. However, these still have some problems. The former requires a large amount of a polyamidoepichlorohydrin resin for ensuring PVA of satisfactory water resistance. In the latter, PVA produced could have good water resistance, but the viscosity of its aqueous solution is extremely unstable. In addition, using such a polyamidoepichlorohydrin resin and a polyaldehyde is unfavorable for safety.

Still another method is known for obtaining water resistant PVA, which comprises adding a titanium lactate to an aqueous composition containing PVA (see Japanese Patent Laid-Open No. 94768/1974). However, this also has some problems. Concretely, when the PVA composition is shaped into sheets, or is applied onto substrates to form PVA-coated sheets, and when the sheets are processed at relatively low temperatures around room temperature, the thus-processed sheets are degraded in boiling water, as so demonstrated in Comparative Example 1 given hereinunder. This means that the water resistance of PVA processed according to the method is not satisfactory. In addition, the viscosity of an aqueous solution of the titanium lactate-containing PVA is unstable at low temperatures.

Also known is adding a filler such as titanium oxide or the like to a thermal recording material that comprises a modified PVA having an ethylene unit content of from 3 to 15 mol % with alkali metal ions being added thereto (see Japanese Patent Laid-Open No. 24016/1997). However, even though containing titanium oxide added thereto, the water resistance of the PVA film is still extremely poor, as so demonstrated in Comparative Example 4 given hereinunder.

Also known is an adhesive that comprises a modified PVA having an ethylene unit content of from 1 to 24 mol % with an inorganic filler such as titanium sulfate or the like being added thereto (see Japanese Patent Laid-Open No. 283682/1996). However, even though containing titanium sulfate added thereto, the water resistance of the PVA adhesive is still extremely poor, as so demonstrated in Comparative Example 5 given hereinunder.

SUMMARY OF THE INVENTION

One object of the present invention is to provide a water resistant composition, of which the film formed by itself or the coat layer formed on a substrate is highly resistant not only to cold water but also to warm water and hot water, even after dried or heat-treated at relatively low temperatures not higher than 70° C., especially falling between room temperature and 50° C., or even at around room temperature, and which is free from problems of viscosity stability and safety.

Another object of the invention is to provide a coating agent that comprises the composition.

Still another object is to provide a thermal recording material having a coat layer of the composition.

Still another object is to provide a recording material having an ink-absorbing layer of the composition, especially an ink-jet recording material having it, and also to provide such a recording material especially an ink-jet recording material in which the absorbent layer is a coat layer of the composition.

The objects of the invention are attained by providing a water resistant composition comprising (A) at least one selected from modified PVA containing from 1 to 20 mol % of $\alpha$-olefin units with not more than 4 carbon atoms, modified PVA containing from 0.01 to 1 mol % of silyl groups, and modified PVA containing from 1 to 20 mol % of $\alpha$-olefin units with not. more than 4 carbon atoms and from 0.01 to 1 mol % of silyl groups, and (B) an organotitanium compound having a chelating ligand, wherein the blend ratio of the component (A) to the component (B), (A)/(B) falls between 99.99/0.01 and 60/40 by weight.

DETAILED DESCRIPTION OF THE PREFERRED EMBODIMENTS

Modified PVA (A) containing from 1 to 20 mol % of $\alpha$-olefin units to be in the water resistant composition of the invention is obtained by hydrolyzing an $\alpha$-olefin -vinyl ester copolymer prepared through polymerization of a vinyl ester monomer in the presence of an $\alpha$-olefin (for example, in the presence of its gas such as ethylene, propylene or the like which is gaseous under normal pressure). The vinyl ester monomer includes, for example, vinyl formate, vinyl acetate, vinyl propionate, vinyl valerate, vinyl caproate, vinyl laurate, vinyl stearate, vinyl benzoate, vinyl pivalate, vinyl versatate, etc. In general, preferred is vinyl acetate. To polymerize such a vinyl ester monomer, employable herein is any known method of solution polymerization, bulk polymerization, suspension polymerization, emulsion polymerization, etc. Generally employed is solution polymerization, for which the solvent is an alcohol such as methanol, etc. The polymerization temperature is not specifically defined, but may fall generally between 0° C. and 150° C. To hydrolyze the resulting vinyl ester polymer, employable herein is any known method. In general, the vinyl ester polymer is hydrolyzed in an alcohol solvent (optionally containing a small amount of water) in the presence of a sodium alcoholate or an alkali such as sodium hydroxide, potassium hydroxide, etc.

The modified PVA (A) may also be a modified PVA having a group such as mercapto group or carboxyl group at the terminal of PVA, which is obtained by copolymerizing an α-olefin and a vinyl ester monomer in the presence of a thiol compound such as thiolacetic acid, mercaptopropionic acid, an alkylmercaptan with not more than 18 carbon atoms or the like, followed by hydrolyzing the resulting copolymer.

In the modified PVA (A), it is important that the content of α-olefin units with not more than 4 carbon atoms falls between 1 and 20 mol %, but preferably between 1.5 and 18 mol %, more preferably between 2 and 15 mol %, most preferably between 2 and 13 mol %. If the α-olefin content oversteps the defined range, the objects of the invention could not be attained as will be understood from the data of Comparative Examples 11 and 12 given hereinunder.

Ethylene, propylene, 1-butene and isobutene are within the scope of α-olefins with not more than 4 carbon atoms. As in Examples given hereinunder, ethylene is the best for use in the invention.

Another type of the modified PVA (A) for use herein is a modified PVA containing from 1 to 20 mol % of α-olefin units with not more than 4 carbon atoms and from 0.01 to 1 mol % of silyl groups, and this is the best for the invention as producing better results, as in Examples given hereinunder.

Modified PVA (A) of the type having α-olefin units with not more than 4 carbon atoms and having silyl groups can be obtained in various methods. In general, it is produced according to the above-mentioned method of producing modified PVA having α-olefin units, in which, however, the α-olefin with not more than 4 carbon atoms is copolymerized with the vinyl ester and with an olefinic unsaturated monomer having a silyl group (I) mentioned below or having a group capable of forming the silyl group (I) after polymerization and by hydrolysis, and the resulting vinyl ester copolymer is hydrolyzed.

The silyl group to be in the modified PVA is preferably represented by the following formula (I):

(I)

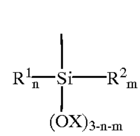

wherein $R^1$ represents a hydrogen atom, or a hydrocarbon group with not more than 8 carbon atoms, preferably an alkyl group, which may have a substituent group; $R^2$ represents an alkoxyl or acyloxyl group with from 1 to 40 carbon atoms, which may have oxygen-containing substituent(s); n indicates an integer of from 0 to 2 and m indicates an integer of from 0 to 3, with n+m being at most 3; X represents a monovalent metal. The monovalent metal for X is, for example, sodium or potassium, and it is introduced into the group principally during hydrolysis.

The silyl group (I) is in the side chains or at the terminals of the modified PVA (A), wherein the silyl group (I) is bonded to the side chain or to the terminal via a linking group therebetween which is not cleaved through hydrolysis.

Specific examples of olefinic unsaturated monomers having a silyl group (I) or a group capable of forming a silyl group (I) after polymerization and hydrolysis are vinyltrimethoxysilane, vinyltris(β-methoxyethoxy)silane, allyltrimethoxysilane, vinyltriacetoxysilane, allyltriacetoxysilane, vinylmethyldimethylsilane, vinyldimethylmethoxysilane, vinylmethyldiethoxysilane, vinyldimethylethoxysilane, vinylmethyldiacetoxysilane, vinyldimethylacetoxysilane, vinylisobutyldimethoxysilane, vinyltriisopropoxysilane, vinyltributoxysilane, vinyltrihexyloxysilane, vinylmethoxydihexyloxysilane, vinyldimethoxyoctyloxysilane, vinylmethoxydioctyloxysilane, vinyltrioctyloxysilane, vinylmethoxydilauryloxysilane, vinyldimethoxylauryloxysilane, vinylmethoxydioleyloxysilane, vinyldimethoxyoleyloxysilane, 3-(meth)acrylamidopropyltrimethoxysilane, 3-(meth)acrylamidopropyltriethoxysilane, 3-(meth)acrylamidopropyltri(β-methoxyethoxy)silane, 2-(meth)acrylamido-2-methylpropyltrimethoxysilane, 2-(meth)acrylamido-2-methylethyltrimethoxysilane, N-(2-(meth)acrylamidoethyl)aminopropyltrimethoxysilane, 3-(meth)acrylamidopropyltriacetoxysilane, 2-(meth)acrylamidoethyltrimethoxysilane, 1-(meth)acrylamidomethyltrimethoxysilane, 3- (meth)acrylamidopropylmethyldimethoxysilane, 3-(meth)acrylamidopropyldimethylmethoxysilane, 3-(N-methyl-(meth)acrylamido )propyltrimethoxysilane, 3-((meth)acrylamidomethoxy)-3-hydroxypropyltrimethoxysilane, 3-((meth)acrylamidomethoxy)propyltrimethoxysilane, dimethyl-3-(meth)acrylamidopropyl-3-(trimethoxysilyl)propylammonium chloride, dimethyl-2-(meth)acrylamido-2-methylpropyl-3-(trimethoxysilyl)propylammonium chloride, etc. However, these are not limitative. It is important that the silyl group content of the modified PVA (A) falls between 0.01 and 1 mol %, but preferably between 0.1 and 1 mol %.

In the modified PVA (A) having α-olefin units with not more than 4 carbon atoms and having silyl groups, the preferred range of the content of the α-olefin units with not more than 4 carbon atoms may be the same as that in the above-mentioned other type of modified PVA (A) having α-olefins with not more than 4 carbon atoms.

Another method for producing the modified PVA (A) having α-olefins with not more than 4 carbon atoms and having silyl groups such as those of formula (I) mentioned above comprises the step of producing the above-mentioned, modified PVA having α-olefin units, in which, however, the α-olefin is polymerized with the vinyl ester in the presence of an epoxy group-having comonomer, such as allyl glycidyl ether, butadiene monoxide or the like, and the resulting, epoxy group-having α-olefin-vinyl ester copolymer is reacted with a compound having both a mercapto group and a silyl group in one molecule, such as trimethoxysilylmethylmercaptan or the like, and thereafter hydrolyzed to give the intended modified PVA. In still another method for producing it that comprises the step of producing the above-mentioned, modified PVA having α-olefin units, the α-olefin is polymerized with the vinyl ester in the presence of a compound having both a mercapto group and a silyl group in one molecule and serving as a chain transfer agent, such as trimethoxysilylmethylmercaptan or the like, and the resulting α-olefin-vinyl ester polymer is hydrolyzed to give the intended modified PVA having both α-olefin units and silyl groups. In this, PVA produced is silyl-modified at the terminals. However, these methods are not limitative.

Also usable herein is still another type of modified PVA containing from 0.01 to 1 mol %, preferably from 0.1 to 1 mol % of silyl groups such as those of formula (I) mentioned above. Modified PVA of the type having such silyl groups can be obtained in various methods. In general, it is produced in an ordinary process of producing PVA, in which, however, the vinyl ester monomer is copolymerized with an olefinic unsaturated monomer having a silyl group (I) mentioned above or having a group capable of forming the silyl group (I) after polymerization and by hydrolysis, and the resulting vinyl ester copolymer is hydrolyzed. Another method for producing the modified PVA (A) having silyl groups (I) comprises a step of ordinary PVA production, in which, however, the vinyl ester monomer is polymerized in the presence of an epoxy group-having comonomer, such as allyl glycidyl ether, butadiene monoxide or the like, and the resulting, epoxy group-having vinyl ester copolymer is reacted with a compound having both a mercapto group and a silyl group in one molecule, such as trimethoxysilylmethylmercaptan or the like, and thereafter hydrolyzed to give the intended modified PVA. In still another method for producing it that comprises a step of ordinary PVA production, the vinyl ester monomer is polymerized in the presence of a compound having both a mercapto group and a silyl group in one molecule and serving as a chain transfer agent, such as trimethoxysilylmethylmercaptan or the like, and the resulting vinyl ester polymer is hydrolyzed to give the intended modified PVA having silyl groups. In this, PVA produced is silyl-modified at the terminals. However, these methods are not limitative.

The degree of polymerization of the modified PVA (A) for use in the invention is not specifically defined, but preferably falls between 50 and 10000, more preferably between 100 and 7000, even more preferably between 150 and 5000, most preferably between 200 and 4000. The degree of polymerization of PVA is measured according to JIS K6726. Briefly, a sample to give PVA is hydrolyzed and purified, and its intrinsic viscosity is measured in water at 30° C., from which is derived the degree of polymerization of the PVA measured.

The degree of hydrolysis of the modified PVA (A) is not also specifically defined, but preferably falls between 65 and 99.99 mol %, more preferably between 80 and 99.8 mol %, even more preferably between 90 and 99.7 mol %.

Not departing from the spirit and scope of the invention, the modified PVA (A) may contain one or more other monomer units with no problem. Examples of additional monomer units which the modified PVA (A) may contain are units of unsaturated acids such as acrylic acid, methacrylic acid, crotonic acid, fumaric acid, maleic anhydride, maleic acid, itaconic acid, etc., and their salts and mono- or di-alkyl esters in which the alkyl group has from 1 to 18 carbon atoms; acrylamides such as unsubstituted acrylamide, N-alkylacrylamides in which the alkyl group has from 1 to 18 carbon atoms, N,N-dimethylacrylamide, 2-acrylamidopropanesulfonic acid and its salts, acrylamidopropyldimethylamine and its acid salts and quaternary salts, etc.; methacrylamides such as unsubstituted methacrylamide, N-alkylmethacrylamides in which the alkyl group has from 1 to 18 carbon atoms, N,N-dimethylmethacrylamide, 2-methacrylamidopropanesulfonic acid and its salts, methacrylamidopropyldimethylamine and its acid salts and quaternary salts, etc.; N-vinylamides such as N-vinylpyrrolidone, N-vinylformamide, N-vinylacetamide, etc.; vinyl cyanides such as acrylonitrile, methacrylonitrile, etc.; vinyl ethers such as alkyl vinyl ethers, hydroxyalkyl vinyl ethers, alkoxyalkyl vinyl ethers and others in which the alkyl group has from 1 to 18 carbon atoms; poly(oxyalkylene) group-having allyl ethers such as polyethylene glycol allyl ether, methoxypolyethylene glycol allyl ether, polypropylene glycol allyl ether, polyethylene glycol-polypropylene glycol allyl ether, etc.; vinyl halides such as vinyl chloride, vinylidene chloride, vinyl fluoride, vinylidene fluoride, vinyl bromide, etc.; and also allyl acetate, allyl chloride, allyl alcohol, dimethylallyl alcohol, etc. However, these are not limitative. The content of such additional monomer units, if any, in the modified PVA (A) is not specifically defined so far as the modified PVA (A) containing them is soluble in water. In general, the additional monomer unit content is preferably at most 10 mol % of the modified PVA (A).

Of the modified PVAs mentioned above, most preferred for use in the invention are those containing from 1 to 20 mol % of α-olefin units with not more than 4 carbon atoms and containing from 0.01 to 1 mol % of silyl groups, and next preferred are those containing from 1 to 20 mol % of α-olefin units with not more than 4 carbon atoms but not containing silyl groups.

Another component (B), an organotitanium compound having a chelating ligand which is to be in the water resistant composition of the invention includes, for example, titanium lactate, its partially or fully neutralized salts (e.g. titanium lactate monoammonium, titanium lactate diammonium titanium lactate monosodium, titanium lactate disodium titanium lactate monopotassium titanium lactate dipotassium), diisopropoxytitaniumbis(triethanolaminate), di-n-butyoxytitanium bis(triethanolaminate), diisopropoxytitanium bis(acetylacetonate), titanium tetrakis (acetylacetonate), polytitanium bis(acetylacetonate), etc. However, these are not limitative. Of the organotitanium compounds, preferred are those soluble in water, concretely including titanium lactate, ammonium titanium lactate, diisopropoxytitanium bis(triethanolaminate), di-n-butoxytitanium bis(triethanolaminate), etc. The organotitanium compounds may be added to the PVA composition of the invention either singly or as combined in any desired manner.

The chelating ligand referred to herein for the organotitanium compounds is meant to indicate a ligand capable of being bonded to one titanium atom in a mode of bidentate or higher polydentate coordination configuration via a covalent bond or a hydrogen bond therebetween. Typically, it includes hydroxycarboxylic acids and their salts (e.g., lactic acid, malic acid, tartaric acid, salicylic acid and their salts, etc.), β-diketones (e.g., acetylacetone, etc.), and aminoalcohols (e.g., triethanolamine, etc.). However, these are not limitative.

In the water resistant composition of the invention, it is important that the blend ratio by weight of the modified PVA (A) to the chelating ligand-having organotitanium compound (B), (A)/(B) falls between 99.99/0.01 and 60/40, but preferably between 99.97/0.03 and 70/30, more preferably between 99.95/0.05 and 80/20, even more preferably between 99/1 and 85/15, still more preferably between 99/1 and 87/13. If the ratio (A)/(B) is larger than 99.99/0.01, the composition is poorly resistant to water, as in Comparative Example 3 given hereinunder; but if smaller than 60/40, the solution of the composition gels, as in Comparative Example 6 also given hereinunder. Accordingly, the ratio (A)/ (B) overstepping the defined range is undesirable.

The PVA composition of the invention comprises a uniform mixture of the specific modified PVA (A), that is, at least one selected from modified PVA containing from 1 to 20 mol % of α-olefin units with not more than 4 carbon atoms, modified PVA containing from 0.01 to 1 mol % of silyl groups, and modified PVA containing from 1 to 20 mol % of α-olefin units with not more than 4 carbon atoms and from 0.01 to 1 mol % of silyl groups, and the specific organotitanium compound (B), that is, an organotitanium compound having a chelating ligand, wherein the blend ratio of the specific modified PVA (A) to the specific organotitanium compound (B), (A)/(B) is specifically defined to fall between 99.99/0.01 and 60/40 by weight. Surprisingly, films of the PVA composition formed by itself or formed by applying it onto substrates are, even though processed at relatively low temperatures not higher than 70° C., for example, falling between room temperature and 50° C., or even at around room temperature, highly resistant to water, especially to boiling water. Also surprisingly, while the aqueous solution of the composition prepared by uniformly mixing the components (A) and (B) is left at low temperatures, its viscosity is extremely stable.

The indispensable requirements for the water resistant composition of the invention are that the composition comprises a uniform mixture of the above-mentioned, specific modified PVA (A) and chelating ligand-having organotitanium compound (B) and that the blend ratio of (A) to (B), (A)/(B) in the composition falls between 99.99/0.01 and 60/40. If desired and depending on its applications, the composition may optionally contain any of solvents, additives, other water-soluble resins, aqueous polymer dispersions, etc. For the solvent for the composition, preferred is water which, however, may be combined with any other solvents of alcohols, ketones, dimethylformamide, dimethyl sulfoxide, etc. Additives to the composition include, for example, defoaming agents, dispersants, nonionic or anionic surfactants, silane coupling agents, pH controlling agents, fillers such as calcium carbonate, clay, talc, flour, etc. Other water-soluble resins that may be added to the composition of the invention include cellulose derivatives such as carboxymethyl cellulose, hydroxyethyl cellulose, etc.; (meth)acrylic polymers such as poly(meth) acrylic acids, polyhydroxy(meth)acrylates and their copolymers, polyacrylamides, etc.; PVA derivatives such as polyvinyl pyrrolidone and its copolymers, polyvinylacetamide, carboxyl group-having modified PVA, sulfuric acid group-having modified PVA, sulfonic acid group-having modified PVA, phosphoric acid group-having modified PVA, quaternary ammonium base-having modified PVA, etc.; and also ordinary PVA, etc. Aqueous polymer dispersions also applicable to the composition include aqueous dispersions of acrylic polymers and copolymers, ethylene-vinyl acetate copolymers, vinyl ester polymers and copolymers, styrene-butadiene copolymers, etc.

In the invention, it is important that the components (A) and (B) are uniformly mixed to give the water resistant composition. For uniformly mixing them, typically employable is a method of dissolving or dispersing the components (A) and (B) in a solvent, preferably water, or a method of mixing an aqueous solution of the component (A) and an aqueous solution of the component (B). In case where moldings, for example, films of the modified PVA (A) are dipped in an aqueous solution of the chelating ligand-having organotitanium compound (B), the components (A) and (B) could not be uniformly mixed. In that case, therefore, water resistant moldings to which the invention is directed could not be obtained, as so demonstrated in Comparative Example 14 given hereinunder.

When the composition comprising the components (A) and (B) of the invention is formed into films by itself or is applied onto substrate to form a coat layer thereon, and when the films or the coated substrates are dried or heat-treated at low temperatures such as around room temperature, they become highly resistant not only to cold water but also to warm water and even boiling water. Therefore, in general, the films or the coat layers of the composition of the invention do not require any specific high-temperature treatment. However, in order to make them more highly resistant to water, they may be dried or heat-treated at high temperatures with no problem, depending on their applications. In such a case, however, the films or the coat layers of the composition will be discolored but rarely. Therefore, it is undesirable to process them at extremely high temperatures. In general, processing them under heat at around 70° C. or lower will be enough for the intended purpose.

As having the advantages of good water resistance even after low-temperature treatment, good film-forming capability, and high film strength, the composition comprising the components (A) and (B) of the invention are favorable to coating agents for inorganic materials and organic materials such as paper, resin substrates and others, especially to surface-coating agents for paper and resin films. Resin films to which the composition of the invention is applicable include, for example, films of polyesters, polystyrenes, polyamides, polyvinyl chlorides, polymethyl methacrylates, cellulose acetates, polycarbonates, polyimides, etc.

In addition, the composition of the invention is also favorable for coat layers, especially overcoat layers for thermal recording materials that could not be heat-treated at high temperatures.

Further, the composition of the invention is also favorable for ink-absorbing layers for recording materials, especially those for ink-jet recording materials. More effectively, such an ink-absorbing layer of the composition of the invention is formed on substrates to be a coat layer thereon.

Apart from the above, the water resistant composition of the invention has many other applications, for example, for adhesives and binders for inorganic or organic materials; vehicles for coating materials; dispersants for pigments; polymerization stabilizers and post-additives for crosslinking emulsions; image-forming materials such as gelatin blends, photosensitive resins, etc.; substrates for hydrogels such as microbial cells-fixing gels, enzyme-fixing gels, etc.; and still others for which water-soluble resins have heretofore been used. In addition, it is also usable for forming moldings such as films, sheets, fibers, etc.

The composition of the invention is especially favorable for coat layers for thermal recording materials (e.g., thermal recording paper), which will be described in detail hereinunder.

As so mentioned above, PVA must be subjected to long-time heat treatment at high temperatures not lower than 100° C., but as the case may be, not lower than 120° C. in order that it could be satisfactorily resistant to water. However, in case where PVA is used in forming an overcoat layer (surface-protective layer) of thermal recording material, and if the overcoat layer of PVA is heat-treated at such high temperatures, the thermo-sensitive coloring layer of the material will color. In that case, therefore, the overcoat layer of PVA could not be heat-treated at high temperatures, and it could not be satisfactorily resistant to water.

As opposed to this, in case where the composition of the invention is used in forming an overcoat layer of thermal recording material, the overcoat layer formed can be highly resistant to water after it is processed at relatively low temperatures not higher than 70° C., for example, at temperatures falling between room temperature and 50° C. or so. As in this case, the composition of the invention can form such a highly water resistant, surface-protective overcoat layer even on thermal recording material, not inducing coloration of the thermo-sensitive coloring layer of the material.

Using the uniform mixture composition of the components (A) and (B) of the invention in forming such an overcoat layer of thermal recording material is the best; but the composition may also be used in forming at least one of the thermo-sensitive coloring layer, undercoat layer and substrate of thermal recording material. In the thermal recording material referred to herein, the thermo-sensitive coloring layer is a layer comprising a thermo-sensitive dye, a developer and a dispersant; the overcoat layer is a surface-protective layer to be on the thermo-sensitive coloring layer; and the undercoat layer is a layer to be between the thermo-sensitive coloring layer and the substrate.

Some type of thermal recording material will not have an overcoat layer, in which the thermo-sensitive coloring layer is the uppermost layer (surface layer). For the thermo-sensitive coloring layer of the type of thermal recording material, the composition comprising the components (A) and (B) of the invention is effective. In that manner, in the thermal recording material to be provided by the invention, using the composition comprising the components (A) and (B) for forming the uppermost layer (overcoat layer or thermo-sensitive coloring layer) is extremely effective.

The total of the components (A) and (B) to be in the thermo-sensitive coloring layer of the thermal recording material preferably falls between 0.1 and 50 parts by weight, more preferably between 0.5 and 40 parts by weight, even more preferably between 1 and 30 parts by weight, relative to 100 parts by weight of the thermo-sensitive dye or developer therein.

The thermo-sensitive dye and the developer to be in the thermo-sensitive coloring layer will be dispersed in a sand grinder with many glass beads therein having a mean diameter of from 0.2 to 3 mm (preferably from 0.3 to 0.8 mm). The time for dispersion may fall between 1 hour and 1 week (preferably between 3 hours and 4 days, but between 1 and 4 days for obtaining fine grains having a mean grain size of at most 0.45 $\mu$m). According to the method, obtained is an aqueous dispersion comprising, as the dispersoid, a thermo-sensitive dye and a developer having a grain size of from 0.1 to 1 $\mu$m (preferably from 0.2 to 0.8 $\mu$m, more preferably from 0.2 to 0.6 $\mu$m, even more preferably between 0.2 to 0.45 $\mu$m).

The thermo-sensitive dye for use in the invention is not specifically defined, and may be any ones generally used in ordinary pressure-sensitive or thermal recording paper. Concretely, it includes triarylmethane compounds such as 3,3-bis(p-dimethylaminophenyl)-6-dimethylaminophthalide (crystal violet lactone), 3-(p-dimethylaminophenyl)-3-(1,2-dimethylindol-3-yl)phthalide, 3-(p-dimethylaminophenyl)-3-(2-phenylindol-3-yl)phthalide, 3,3-bis(9-ethylcarbazol-3-yl)-5-dimethylaminophthalide, etc.; diphenylmethane compounds such as 4,4'-bis(dimethylamino)benzhydrin benzyl ether, N-halophenyl-leucoauramines, etc.; xanthene compounds such as rhodamine B-anilinolactam, 3-diethylamino-7-benzylaminofluoran, 3-diethylamiono-7-butylaminofluoran, 3-diethylamino-7-(chloroanilino) fluoran, 3-diethylamino-6-methyl-7-anilinofluoran, 3-piperidino-6-methyl-7-anilinofluoran, 3-ethyltolylamino-6-methyl-7-anilinofluoran, 3-cyclohexylmethylamino-6-methyl-7-anilinofluoran, 3-diethylamino-6-chloro-7-(β-ethoxyethyl)aminofluoran, 3-diethylamino-6-chloro-7-(γ-chloropropyl) aminofluoran, 3-(N-ethyl-N-isoamyl)-6-methyl-7-phenylaminofluoran, 3-dibutylamino-6-methyl-7-anilinofluoran, etc.; thiazine compounds such as benzoylleucomethylene blue, p-nitrobenzoyl-leucomethylene blue, etc.; spiro compounds such as 3-methyl-spiro-dinaphthopyran, 6'-[ethyl (3-methyl butyl) amino]-3'-methyl-2'-(phenyl amino) -spiro [isobenzofuran-1 (3H), 9'-(9H) xanthin]-3-on. 3-ethyl-spiro-dinaphthopyran,3-benzyl-spirodinaphthopyran, 3-methylnaphtho-(3-methoxybenzo)-spiropyran, etc. These may be used either singly or as combined in the thermal recording material. Depending on the use of the thermal recording material containing them, the thermo-sensitive dyes may be suitably selected and used in the material.

The developer for use in the invention is preferably any of phenolic derivatives, and aromatic carboxylic acid derivatives. More preferred are bisphenols. Concretely, phenols usable herein include p-octylphenol, p-tert-butylphenol, p-phenylphenol, 1,1-bis(p-hydroxyphenyl)propane, 2,2-bis (p-hydroxyphenyl)propane, 1,1-bis(p-hydroxyphenyl) pentane, 1,1-bis(p-hydroxyphenyl)hexane, 2,2-bis(p-hydroxyphenyl)hexane, 1,1-bis(p-hydroxyphenyl)-2-ethylhexane, 2,2-bis(4-hydroxy-3,5-dichlorophenyl) propane, dihydroxydiphenyl ether; and aromatic carboxylic acid derivatives also usable herein include p-hydroxybenzoic acid, ethyl p-hydroxybenzoate, butyl p-hydroxybenzoate, 3,5-di-tert-butylsalicylic acid, 3,5-di-α-methylbenzylsalicylic acid, and polyvalent metal salts of these carboxylic acids, etc.

For forming the thermo-sensitive coloring layer in the invention, employable are any known coating methods of air-knife coating, plating, gravure coating, roll coating, spraying, dipping, bar coating, extrusion coating, etc.

In case where an aqueous solution of a uniform mixture of the components (A) and (B), to which are optionally added any of fillers (e.g., kaolin, clay, calcium carbonate, talc, etc.), other water-soluble resins, polymer dispersions and others, is applied onto a substrate to form a surface overcoat layer (surface-protective layer) thereon, the amount of the coating liquid to form the overcoat layer (in terms of the total solid content of the coating liquid) will be suitably selected within a range within which the overcoat layer formed will not interfere with heat conduction from a thermal head to the underlying coloring layer. In general, the amount may fall between 1 and 20 g/m$^2$, but preferably between 2 and 15 g/m$^2$. The total of the components (A) and (B) to be in the coating liquid (in terms of the solid content of the coating liquid) may fall between 0.1 and 10 g/m$^2$, but preferably between 0.2 and 7 g/m$^2$.

The composition comprising the components (A) and (B) of the invention may also be used in forming the undercoat layer to be between the substrate and the thermo-sensitive coloring layer.

As so demonstrated in Examples given hereinunder, the coat layer, especially the overcoat layer of the composition of the invention in thermal recording material is satisfactorily resistant to water even though it is processed at relatively low temperatures. According to the invention, therefore, obtainable is thermal copying paper in which the thermo-sensitive coloring layer is prevented form coloring in the step of processing the overcoat layer. In addition, in case where the thermal copying paper obtained in the invention is printed by the use of a thermal printer, the printed image is sharp and clear, and has good plasticizer resistance and oil resistance.

Paper is typical for the substrate for the thermal recording material of the invention. In addition to it, also usable are resin films of, for example, polyesters, polystyrenes, polyamides, polyvinyl chlorides, polymethyl methacrylates, cellulose acetates, polycarbonates, polyimides, etc.

The composition of the invention is also favorable for ink-absorbing layers for recording materials, especially those for ink-jet recording materials, which will be described in detail hereinunder.

Recording liquid (aqueous ink or oily ink) applies to, for example, fountain pens, ball-point pens, felt-tip pens, ceramic-tip pens, pens for fluorescent letters and images, and also pen plotters comprising any of these. It also applies to ink-jet recording systems in which ink drops are jetted onto a recording material to record letters and images thereon.

As having the advantage of noiseless and high-speed operability to enable color image formation with no difficulty, ink-jet recording systems are being much used in facsimiles, printers, etc. In such ink-jet recording systems, heretofore, the recording material is ordinary paper. However, the recent improvement in the capabilities of ink-jet recording machines for high-speed multi-color image formation has brought about more high-level requirements for ink-jet recording substrates. The first is that they must ensure rapid ink absorption; the second is that the diameter of each ink dot applied onto them must not be larger than a predetermined range; the third is that the shape of each ink dot applied onto them is almost a complete round; and the fourth is that they are easy to handle and store. To meet the requirements, various ink-absorbing materials of PVA, polyacrylamide and others have been studied and tried. However, improving the ink absorbability of the materials is often contrary to the water resistance thereof, and the outstanding problems with ink-absorbing layers of improved ink absorbability are that they often peel away when brought into contact with water and the letters and images printed on them are often blurred.

In the invention, the composition comprising the components (A) and (B) is used in forming an ink-absorbing layer of a recording material, and the recording material thus provided by the invention meets the requirements as above. Specifically, the ink-absorbing layer formed from the composition has good ink absorbability, and sharp and clear letters and images can be printed on the recording material having the ink-absorbing layer. In addition, the ink-absorbing layer is highly resistant to water, even though processed at low temperatures, and the recording material having it is favorable to ink-jet recording systems. Moreover, the invention makes it possible to provide an opaque recording material having an ink-absorbing layer on a paper substrate and favorable to ink-jet recording systems; to provide a transparent recording material for ink-jet recording systems, which is applicable to slide projectors, OHPs (over-head projectors) and the like where the images recorded on the material are projected onto a screen by means of an optical instrument; and to provide a transparent recording material for ink-jet recording systems, which is applicable to color displays and the like for transmitted optical image displaying applications. The other advantages of the recording materials thus provided by the invention are that they stick little to others and that the letters and images printed on them are blurred little.

In case where the composition of the invention is used in forming the ink-absorbing layer of the recording material mentioned above, a filler may be added thereto. The filler includes, for example, fine grains of synthetic silica, clay, talc, diatomaceous earth, zeolite, calciumcarbonate, alumina, zinc oxide, satin white, organic pigment, etc. However, these are not limitative.

In addition, a cationic resin serving as an ink fixer may also be added to the composition for the ink-absorbing layer. The cationic resin includes monomers, oligomers and polymers of primary to tertiary amines and quaternary ammonium salts capable of dissociating in water to be cationic. Preferred for use herein are oligomers and polymers of such amines and quaternary ammonium salts. Concretely, they include dimethylamine-epichlorohydrin polycondensates, acrylamide-diallylamine copolymers, polyvinylamine copolymers, dimethyldiallylammonium chloride polymers, polyethylenimines, etc. However, these are not limitative. Further, any other water-soluble resins and aqueous polymer dispersions such as those mentioned hereinabove may also be added to the composition for the ink-absorbing layer.

The supporting substrates for the recording material of the invention for ink-jet recording systems and others may be any known transparent or opaque supporting substrates. Transparent supporting substrates usable herein include films and sheets of polyesters, polystyrenes, polyamides, polyvinyl chlorides, polymethyl methacrylates, cellulose acetates, polycarbonates, polyimides, cellophanes, celluloids and the like, as well as paper of high transparency, etc. Opaque supporting substrates also usable herein include ordinary paper, pigment-coated paper, fabrics, wood, metal plates, synthetic paper, synthetic resin films and sheets having been specifically processed to be opaque, etc.

For forming the ink-absorbing layer of the composition that comprises the components (A) and (B), in and/or on the surface of the supporting substrate, employable is any ordinary coating method of size pressing, air-knife coating, roll coating, bar coating, blade coating, curtain coating, casting or the like. Preferably, for example, an aqueous solution of the composition, or an aqueous solution or dispersion of a mixture of the composition with any other additives (e.g., filler, ink fixer, water-soluble or water-dispersible resin) is applied onto the upper surface of the supporting substrate or onto both the upper and lower surfaces thereof according to the coating method as above, to thereby form thereon a coat layer that serves as an ink-absorbing layer. In case where the supporting substrate is made of paper, the aqueous solution or dispersion mentioned above may be added to the paper stock from which the paper substrate is prepared. After the composition comprising the components (A) and (B) of the invention is applied to the supporting substrate preferably in such a manner that the composition applied thereto forms a coat layer on the substrate, it is subjected to heat treatment. For this, even when the composition having been applied to the supporting substrate is processed at low temperatures not higher than 70° C., the ink-absorbing layer formed from it can be satisfactorily resistant to water. In the PVA layer having been thus formed through such low-temperature treatment, the crystallinity of PVA can be retarded, and therefore the ink-absorbability of the layer is favorably enhanced. However, such low-temperature treatment is not indispensable to the layer. Needless-to-say, the layer may be processed at high temperatures, if desired.

The total of the modified PVA (A) and the organotitanium compound (B) to be in the recording material of the invention which has such an ink-absorbing layer as above is not specifically defined, but, in general, it preferably falls between 0.1 and 200 $g/m^2$, more preferably between 0.5 and 100 $g/m^2$.

EXAMPLES

The invention is described in more detail with reference to the following Examples, which, however, are not intended to restrict the scope of the invention. Unless otherwise specifically indicated, "%" and "parts" in Examples are all by weight. Degree of swelling and degree of dissolution of sheet samples:

The degree of swelling in water and the degree of dissolution therein of the sheets produced in the following Examples were obtained according to the following equations:

$$\text{Degree of swelling (times)}=b/(a\times e/d),\ \text{Degree of dissolution (\%)}=[\{(a\times e/d)-c\}/(a\times e/d)]\times 100,$$

wherein;

a indicates the original weight (g) of one sample of a sheet to be tested, which is not dipped in water, b indicates the wet weight (g) of the sheet sample having been dipped in water at 20° C. for 24 hours and then pulled out of the bath, c indicates the dry weight (g) of the sheet sample having been dipped in water at 20° C. for 24 hours, then pulled out of the bath, and dried at 105° C. for 24 hours, d indicates the original weight (g) of another sample of the sheet, e indicates the dry weight (g) of the sheet sample of d, which was directly dried at 105° C. for 24 hours.

First described are examples of producing typical modified PVAs (three PVAs of PVA-1, PVA-5 and PVA-9) which are used in the following Examples.

Production Example 1

Production of PVA Having Ethylene Units 59.2 kg of vinyl acetate and 6.2 kg of methanol were put into a 100 liter pressure reactor equipped with a stirrer, a nitrogen inlet port, an ethylene inlet port and an initiator inlet port, then heated up to 60° C., and thereafter purged with nitrogen by nitrogen bubbling thereinto for 30 minutes. Next, ethylene was introduced into the reactor so that its pressure in the reactor could be 0.6 MPa. On the other hand, a solution in methanol of 2,2'-azobis(4-methoxy-2,4-dimethylvaleronitrile) serving as an initiator was prepared in a different reactor, which was then purged with nitrogen by nitrogen gas bubbling thereinto. The initiator concentration in the solution prepared was 2.8 g/liter. The inner temperature of the polymerization reactor was conditioned at 60° C., and 66 ml of the thus-prepared initiator solution was fed into the polymerization reactor. In that condition, polymerizing the monomers in the polymerization reactor was started. During the polymerization, ethylene was continuously introduced into the reactor to have a controlled pressure of 0.6 MPa, the polymerization temperature was kept at 60° C., and the initiator solution was also continuously introduced thereinto at a rate of 200 ml/hr. After 4 hours, the degree of polymerization reached 40%. In this stage, the reactor was cooled to stop the polymerization. Next, the reactor was degassed to remove ethylene, and then bubbled with nitrogen gas to complete ethylene removal. Then, the reactor was further degassed to remove the non-reacted vinyl acetate monomer. Thus was obtained a polymer solution in methanol. The solution was conditioned to have a polymer concentration of 20%, and then hydrolyzed with a solution of NaOH in methanol (having an NaOH concentration of 10%) added thereto. The molar ratio of NaOH added to the polymer, polyvinyl acetate PVAC (mols of NaOH/mols of polyvinyl acetate (PVAc)) was 0.05. The modified PVA (PVA-1) thus prepared herein had a degree of hydrolysis of 98.4 mol %.

The PVAC solution in methanol thus prepared herein through polymerization followed by removal of non-reacted vinyl acetate monomer was purified through repeated precipitation. Briefly, it was precipitated in n-hexane, and the resulting polymer precipitate was again dissolved in acetone. The precipitation-dissolution cycle for purification was repeated three times. Next, the thus-purified precipitate was dried at 60° C. under reduced pressure to obtain a pure PVAc. The degree of ethylene modification of this PVAc obtained through proton NMR was 4.5 mol %. The PVAC solution in methanol was hydrolyzed with an alkali, for which the molar ratio of the alkali to the polymer was 0.2. After having been thus hydrolyzed, this was extracted with methanol for Soxhlet extraction for 3 days, and then dried to obtain a pure PVA. The mean degree of polymerization of the pure PVA was measured according to JIS K6726, and was 1550.

Production Example 2

Production of PVA Having Silyl Groups and Ethylene Units 51.6 kg of vinyl acetate, 13.7 kg of methanol and 111.0 g of vinyltrimethoxysilane were put into a 100 liter pressure reactor equipped with a stirrer, a nitrogen inlet port, an ethylene inlet port and an initiator inlet port, then heated up to 60° C., and thereafter purged with nitrogen by nitrogen bubbling thereinto for 30 minutes. Next, ethylene was introduced into the reactor so that its pressure in the reactor could be 0.65 MPa. On the other hand, a solution in methanol of 2,2'-azobis(4-methoxy-2,4-dimethylvaleronitrile) serving as an initiator was prepared in a different reactor, which was then purged with nitrogen by nitrogen gas bubbling thereinto. The initiator concentration in the solution prepared was 2.8 g/liter. The inner temperature of the polymerization reactor was conditioned at 60° C., and 126 ml of the thus-prepared initiator solution was fed into the polymerization reactor. In that condition, polymerizing the monomers in the polymerization reactor was started. During the polymerization, ethylene was continuously introduced into the reactor to have a controlled pressure of 0.65 MPa, the polymerization temperature was kept at 60° C., and the initiator solution was also continuously introduced thereinto at a rate of 390 ml/hr. After 4 hours, the degree of polymerization reached 50%. In this stage, the reactor was cooled to stop the polymerization. Next, the reactor was degassed to remove ethylene, and then bubbled with nitrogen gas to complete ethylene removal. Then, the reactor was further degassed to remove the non-reacted vinyl acetate monomer. Thus was obtained a polymer solution in methanol. The solution was conditioned to have a polymer concentration of 25%, and then hydrolyzed with a solution of NaOH in methanol (having an NaOH concentration of 10%) added thereto. The molar ratio of NaOH added to the polymer, polyvinyl acetate (mols of NaOH/mols of polyvinyl acetate) was 0.05. The modified PVA (PVA-5) thus prepared herein had a degree of hydrolysis of 98.2 mol %.

The PVAc solution in methanol thus prepared herein through polymerization followed by removal of non-reacted vinyl acetate monomer was purified through repeated precipitation. Briefly, it was precipitated in n-hexane, and the resulting polymer precipitate was again dissolved in acetone. The precipitation-dissolution cycle for purification was repeated three times. Next, the thus-purified precipitate was dried at 60° C. under reduced pressure to obtain a pure PVAc. The degree of ethylene modification and the degree of vinyltrimethoxysilane modification of this PVAc obtained through proton NMR were 6.5 mol %, and 0.25 mol %, respectively. The PVAc solution in methanol was hydrolyzed with an alkali, for which the molar ratio of the alkali to the polymer was 0.2. After having been thus hydrolyzed, this was extracted with methanol for Soxhlet extraction for 3 days, and then dried to obtain a pure PVA. The mean degree of polymerization of the pure PVA was measured according to JIS K6726, and was 1030.

Production Example 3

Production of PVA Having Silyl Groups 39.0 kg of vinyl acetate, 21.0 kg of methanol and 168.0 g of vinyltrimethoxysilane were put into a 100 liter pressure reactor equipped with a stirrer, a nitrogen inlet port and a ref lux condenser, then heated up to 60° C., and thereafter purged with nitrogen by nitrogen bubbling thereinto for 30 minutes. The inner temperature of the polymerization reactor was conditioned at 60°C., and 20 g of 2,2 -azobis (isobutyronitrile) serving as an initiator was fed into the reactor. With the polymerization temperature being kept at 60° C., the monomers were polymerized. After 5 hours, the degree of polymerization reached 50%. In this stage, the reactor was cooled to stop the polymerization. Next, the reactor was degassed to remove the non-reacted vinyl acetate monomer. Thus was obtained a polymer solution in methanol. The solution was conditioned to have a polymer concentration of 25%, and then hydrolyzed with a solution of NaOH in methanol (having an NaOH concentration of 10%) added thereto. The molar ratio of NaOH added to the polymer, polyvinyl acetate (mols of NaOH/mols of polyvinyl acetate) was 0.03. The modified PVA (PVA-9) thus prepared herein had a degree of hydrolysis of 98.4 mol %.

The PVAC solution in methanol thus prepared herein through polymerization followed by removal of non-reacted vinyl acetate monomer was purified through repeated precipitation. Briefly, it was precipitated in n-hexane, and the resulting polymer precipitate was again dissolved in acetone. The precipitation-dissolution cycle for purification was repeated three times. Next, the thus-purified precipitate was dried at 60° C. under reduced pressure to obtain a pure PVAc. The degree of vinyltrimethoxysilane modification of this PVAc obtained through proton NMR was 0.25 mol %. The PVAc solution in methanol was hydrolyzed with an alkali, for which the molar ratio of the alkali to the polymer was 0.2. After having been thus hydrolyzed, this was extracted with methanol for Soxhlet extraction for 3 days, and then dried to obtain a pure PVA. The mean degree of polymerization of the pure PVA was measured according to JIS K6726, and was 1550.

Example 1

PVA-1 produced in Production Example 1 (having a degree of polymerization of 1550, a degree of hydrolysis of 98.4 mol %, and a degree of ethylene modification of 4.5 mol %) was dissolved in water to prepare an aqueous 4.5%PVA solution. To 100 parts of the aqueous PVA solution, added was 1.1 parts (0.5 parts as pure titanium lactate) of TC-310 (Matsumoto Pharmaceutical Industry's 45 t titanium lactate solution) to prepare an aqueous 5% solution of a uniform mixture of a water resistant composition. The solution was spread over a substrate of polyethylene terephthalate (PET) film, and then dried at 20° C. and then the layer composed of the water resistant composition formed on the PET film was peeled off. Thus obtained layer was a colorless transparent sheet (having a thickness of 100$\mu$). The sheet was dipped in water (20° C.) for 24 hours, and the degree of swelling and the degree of dissolution of the sheet were calculated according to the equations mentioned above. The former was 7.7 times, and the latter was 26%. Next, the sheet was dipped in boiling water for 1 hour, and then pulled out of the bath. The sheet was tight and was not deformed at all, and its surface did not become slimy. On the other hand, PVA-1 was dissolved in water to prepare an aqueous 9% solution. To 100 parts of the solution, added was 2.2 parts (1 part as pure titanium lactate) of TC-310 to prepare an aqueous 10% solution of a uniform mixture of a water resistant composition. Immediately after its preparation, the viscosity ($\eta_{0d}$) of the fresh solution was measured with a B-type viscometer at 5° C., and was 1630 mpa·s. The solution was left at 5° C. for 1 week, and its viscosity ($\eta_{7d}$) was measured, and was 3900 mPa·s. The viscosity increase ($\eta_{7d}/\eta_{0d}$) was 2.4 times the original viscosity. This supports good viscosity stability at low temperatures.

Comparative Example 1

A sheet (having a thickness of 100$\mu$) was formed in the same manner as in Example 1, for which, however, PVA-10 having a degree of polymerization of 1550 and a degree of hydrolysis of 98.4 mol %, and not PVA-1 (ethylene-modified PVA), was used as in Table 1. The degree of swelling in water (20° C.) and the degree of dissolution therein of the sheet were calculated in the same manner as in Example 1, and were 16 times and 45%, respectively. When the sheet was dipped in boiling water for 1 hour, it became too brittle and therefore could not be pulled out of the bath, though it kept its shape in the bath. When an aqueous 10% solution of the composition was kept at 5° C., it gelled in a day.

Examples 2 to 11, Comparative Examples 2 to 11

Sheets were formed in the same manner as in Example 1, for which, however, PVA and the organotitanium compound and their amounts were varied as in Table 1 and Table 2. These were tested, and their data are given in Table 2.

Example 12, Comparative Example 13

Sheets were formed in the same manner as in Example 1, for which, however, PVA and the organotitanium compound and their amounts were varied as in Table 1 and Table 2. These were tested, and their data are given in Table 2. For the low-temperature viscosity stability of the compositions prepared herein, 8% solutions were prepared and tested as in Example 1.

Comparative Example 12

Forming a sheet was tried in the same manner as in Example 1, except that PVA-12 having a degree of polymerization of 1550, a degree of hydrolysis of 98.4 mol % and a degree of ethylene modification of 23 mol %, and not PVA-1 (ethylene-modified PVA), was used. In the case, however, PVA-12 did not completely dissolve in water. To dissolve it, therefore, a mixed solvent of water/methanol=90/10 (by weight) was used herein. The sheet thus formed as in Example 1 except for the changes as herein had a thickness of 100$\mu$. This was colorless, but was semi-transparent like frosted glass. For testing it for the degree of swelling and the degree of dissolution, the sheet was dipped in water (20° C.), as in Example 1. The degree of swelling and the degree of dissolution of the sheet thus formed and tested herein were 8.6 times and 35%, respectively. When the sheet was dipped in boiling water for 1 hour, it was completely degraded and could not be pulled out of the bath. On the other hand, a 10% solution of the PVA composition in a mixed solvent of water/methanol (=90/10) was left at 5° C., but it gelled in a day.

Comparative Example 14

PVA-1 was dissolved in water to prepare an aqueous 5% solution of PVA-1. The aqueous solution was spread over a substrate, and then dried at 20° C. to form a colorless transparent sheet (having a thickness of 100$\mu$). The sheet was dipped in an aqueous 5% solution of titanium lactate (TC-310), and then dried at 20° C. This was tested for water resistance as in Example 1. The degree of swelling and the degree of dissolution of the sheet were 8.3 times and 36%, respectively. When the sheet was dipped in boiling water for 1 hour, it was completely degraded and could not be pulled out of the bath.

TABLE 1

α-olefin modified PVA used in Examples and Comparative Examples

| | Degree of Polymerization | Degree of Hydrolysis (mol %) | α-olefin (degree of modification, mol %) | Other Parameters |
|---|---|---|---|---|
| PVA-1 | 1550 | 98.4 | ethylene (4.5) | |
| PVA-2 | 1000 | 98.7 | ethylene (6.8) | |
| PVA-3 | 550 | 97.8 | ethylene (9.0) | |
| PVA-4 | 300 | 99.2 | ethylene (10.5) | |
| PVA-5 | 1030 | 98.2 | ethylene (6.5) | modified with 0.25 mol % vinyltrimethoxysilane |
| PVA-6 | 1450 | 89.0 | ethylene (5.0) | |
| PVA-7 | 300 | 91.0 | ethylene (5.0) | modified with 0.5 mol % methylvinyldimethoxysilane |
| PVA-8 | 2700 | 97.5 | ethylene (2.5) | |
| PVA-9 | 1550 | 98.4 | — | modified with 0.25 mol % vinyltrimethoxysilane |
| PVA-10 | 1550 | 98.4 | — | |
| PVA-11 | 1550 | 98.4 | ethylene (0.6) | |
| PVA-12 | 1550 | 98.4 | ethylene (23) | |

TABLE 2

| | Components of Water resistant Composition and their blend ratio | | | Appearance of Sheets | Water resistance in 20° C. water | | Water resistance | Viscosity Increase |
|---|---|---|---|---|---|---|---|---|
| | Component (A) | Component (B) | (A)/(B) | | Degree of Swelling (times) | Degree of Dissolution (%) | in hot water[1)] | $\eta_{7d}/\eta_{0d}$ (times) |
| Example 1 | PVA-1 | titanium lactate | 90.0/10.0 | colorless transparent | 7.7 | 26 | B | 2.4 |
| Example 2 | PVA-1 | diisopropoxytitanium bis(triethanolaminate) | 98.0/2.0 | colorless transparent | 7.5 | 8 | B | 1.6 |
| Example 3 | PVA-2 | di-n-butoxytitanium bis(triethanolaminate) | 97.0/3.0 | colorless transparent | 4.8 | 22 | B | 1.9 |
| Example 4 | PVA-3 | diisopropoxytitanium bis(acetylacetonate) | 97.0/3.0 | colorless transparent | 7.0 | 5 | B | 2.8 |
| Example 5 | PVA-4 | titanium lactate monoammonium | 95.0/5.0 | colorless transparent | 4.5 | 21 | B | 2.0 |
| Example 6 | PVA-5 | diisopropoxytitanium bis(triethanolaminate) | 98.0/2.0 | colorless transparent | 4.8 | 5 | A | 1.2 |
| Example 7 | PVA-6 | titanium lactate monoammonium | 95.0/5.0 | colorless transparent | 6.1 | 20 | B | 1.7 |
| Example 8 | PVA-7 | titanium lactate | 95.0/5.0 | colorless transparent | 4.5 | 8 | A | 2.4 |
| Example 9 | PVA-8 | titanium lactate monoammonium | 96.0/4.0 | colorless transparent | 7.5 | 24 | B | 2.8 |
| Example 10 | PVA-5 | titanium lactate | 90.0/10.0 | colorless transparent | 4.5 | 4 | A | 2.6 |
| Example 11 | PVA-5 | titanium lactate monoammonium | 95.0/5.0 | colorless transparent | 3.9 | 6 | A | 2.2 |
| Example 12 | PVA-9 | titanium lactate | 90.0/10.0 | colorless transparent | 8.0 | 28 | B | 7.7[2)] |
| Comp. Ex. 1 | PVA-10 | titanium lactate | 90.0/10.0 | colorless transparent | 16 | 45 | C | 3) |
| Comp. Ex. 2 | PVA-1 | — | 100/0 | colorless transparent | 8.5 | 39 | D | 2.3 |
| Comp. Ex. 3 | PVA-1 | titanium lactate | 99.995/0.005 | colorless transparent | 8.5 | 39 | D | 2.3 |
| Comp. Ex. 4 | PVA-1 | titanium oxide | 90.0/10.0 | white | 8.5 | 42 | D | 2.3 |
| Comp. Ex. 5 | PVA-1 | titanium sulfate | 90.0/10.0 | pale blue | 8.4 | 42 | D | 2.3 |

TABLE 2-continued

| | Components of Water resistant Composition and their blend ratio | | | Appearance of | Water resistance in 20° C. water | | in hot | Viscosity Increase |
|---|---|---|---|---|---|---|---|---|
| | Component (A) | Component (B) | (A)/(B) | Sheets | Degree of Swelling (times) | Degree of Dissolution (%) | water[1)] | $\eta_{7d}/\eta_{0d}$ (times) |
| | | | | transparent | | | | |
| Comp. Ex. 6 | PVA-2 | di-n-butoxytitanium bis(triethanolaminate) | 45.0/55.0 | | 4) | | | |
| Comp. Ex. 7 | PVA-2 | — | 100/0 | colorless transparent | 5.3 | 30 | D | 1.8 |
| Comp. Ex. 8 | PVA-3 | — | 100/0 | colorless transparent | 10 | 26 | D | 1.6 |
| Comp. Ex. 9 | PVA-5 | — | 100/0 | colorless transparent | degraded | | D | 1.1 |
| Comp. Ex. 10 | PVA-10 | — | 100/0 | colorless transparent | degraded | | D | 5) |
| Comp. Ex. 11 | PVA-11 | titanium lactate | 90.0/10.0 | colorless transparent | 15 | 42 | C | 3) |
| Comp. Ex. 12 | PVA-12 | titanium lactate | 90.0/10.0 | milky semi-transparent[6)] | 8.6 | 35 | C | 3) |
| Comp. Ex. 13 | PVA-9 | — | 100/0 | colorless transparent | degraded | | D | 7.5[2)] |
| Comp. Ex. 14 | PVA-1 | 7) | | 8) | 8.3 | 36 | D | — |

[1)]A: Swelled little and not deformed. B: Much swelled but not deformed. C: Degraded and failed to pull out. D: Completely dissolved.
[2)]8% solution was tested.
3) Gelled in a day.
4) Gelled when di-n-butoxytitanium bis(triethanolaminate) was added.
5) Gelled in two days.
[6)]Like frosted glass.
7) PVA sheet was dipped in aqueous titanium lactate solution.
8) Its surface had numerous cracks.

The following Examples are to demonstrate thermal recording materials.

Example 1-1

(1) Preparation of coating liquids (thermo-sensitive dye dispersion, pigment dispersion, developer dispersion):

A. Formulation of aqueous dispersion of thermo-sensitive dye:

| | |
|---|---|
| Leuco dye (Yamada Chemical's S-205; 6'-[ethyl(3-methyl butyl)amino]-3'-methyl-2'-(phenyl amino)-spiro [isobenzofuran-1(3H), 9'-(9H)xanthin]-3-on) | 20% |
| Aqueous 10% PVA203 (from Kuraray) solution | 20% |
| Water | 59.9% |
| Defoaming agent (Clariant's Jolsin LB-D | 0.1% |

B. Formulation of aqueous dispersion of developer:

| | |
|---|---|
| Bisphenol A | 20% |
| Aqueous 10% PVA203 (from Kuraray) solution | 20% |
| Water | 59.9% |
| Defoaming agent (Clariant's Jolsin LB-D | 0.1% |

C. Formulation of aqueous dispersion of pigment:

| | |
|---|---|
| Stearamide | 10% |
| Mizukasil P-527 (silica powder, from Mizusawa Chemical) | 20% |
| Aqueous 5% PVA205 (from Kuraray) solution | 30% |
| Water | 40% |

Aqueous dispersions A, B and C were seperately prepared, and were separately pre-stirred in different beakers for 15 minutes.

Next, the aqueous dispersions A and B were transferred into different sand grinders (batch-type desk-top sand grinders, from Kansai Paint), to which were added 300 cc of glass beads (soda-quartz glass beads having a diameter of 0.5 mm). With cooling them, these were milled at a high speed of rotation (2170 rpm) for 6 hours. The grain size of the thus-milled, aqueous dispersion A of thermo-sensitive dye was measured with a laser-diffractometric grain size analyzer (Shimadzu's Model SALD-1000), and was 0.46 μm. The viscosity of the dispersion was measured with a BL-type viscometer at 30° C. and at 30 rpm, and was 29.4 mpa·s.

Next, the aqueous dispersion C was homogenized at 10000 rpm for 2 minutes.

(2) Preparation of binder coating liquid for thermo-sensitive coloring layer:

To PVA (A) having an ethylene unit content of 5.1 mol %, a degree of hydrolysis in the vinyl ester moiety of 99.3 mol %, and a degree of polymerization of 1550, added was 0.15% by weight of a defoaming agent (Jolsin LB-D) to prepare an aqueous 10% PVA solution (a). To 95 parts of the aqueous solution (a) being stirred at room temperature, gradually added was 5 parts of 10% solution (B) of TC-310 (from Matsumoto Pharmaceutical) to prepare a 10% mixture solution of modified PVA and organotitanium compound. In this, the blend ratio of (A)/(B) was 95/5 by weight. Its viscosity was measured with a BL-type viscometer at 30° C. and at 30 rpm, and was 850 mPa·S. After left at 30° C. for 2 weeks, its viscosity was again measured. The viscosity of the stored sample was 1.10 times that of the fresh sample. There was little viscosity change, and the storage stability of the coating liquid prepared herein was good.

(3) Preparation of coating liquid for surface-protective layer:

To PVA (A) having an ethylene unit content of 4.5 mol %, a degree of hydrolysis in the vinyl ester moiety of 98.4 mol %, and a degree of polymerization of 1550, added was 0.15% by weight of a defoaming agent (Jolsin LB-D) to prepare an aqueous 12% PVA solution (b). On the other hand, 0.2 parts of Pronon 104 (wettability improver of ethylene oxide-propylene oxide block copolymer from Nippon Yushi) and 50 parts of Mizukasil P-527 (from Mizusawa Chemical) were well dispersed in 72.5 parts of water added thereto. To the resulting dispersion being still stirred, gradually added was 690 parts of the aqueous solution (b) at room temperature. Next, 7.5 parts of Hydrin (30% dispersion of lubricant, zinc stearate from Chukyo Yushi) was added thereto to prepare an aqueous dispersion of modified PVA with silica. 30 parts of 10% TC-310 solution (B) was gradually added to the aqueous dispersion of modified PVA with silica, with stirring at room temperature to prepare a coating liquid having a solid concentration of 16%. In this, the blend ratio of (A)/(B) was 96.5/3.5 by weight. Its viscosity was measured with a BL-type viscometer at 30° C. and at 30 rpm, and was 580 mPa·S. After left at 30° C. for 2 weeks, its viscosity was again measured. The viscosity of the stored sample was 1.09 times that of the fresh sample. There was little viscosity change, and the storage stability of the coating liquid prepared herein was good.

(4) Preparation of coating liquid for undercoat layer:

To PVA (A) having an ethylene unit content of 7.8 mol %, a degree of hydrolysis in the vinyl ester moiety of 98.3 mol %, and a degree of polymerization of 550, added was 0.15% by weight of a defoaming agent (Jolsin LB-D) to prepare an aqueous 12% PVA solution (c). On the other hand, 100 parts of Ultrawhite 90 (kaolin clay from Engelhard) was well dispersed in 54 parts of water added thereto. To the resulting dispersion being still stirred, gradually added was 830 parts of the aqueous solution (c) at room temperature to prepare an aqueous dispersion of modified PVA with clay. 5 parts of 10% TC-310 solution (B) was gradually added to the aqueous dispersion of modified PVA with clay, with stirring at room temperature to prepare a coating liquid having a concentration of 20%. In this, the blend ratio of (A)/(B) was 99/1 by weight. Its viscosity was measured with a BL-type viscometer at 30° C. and at 30 rpm, and was 340 mP·S. After left at 30° C. for 2 weeks, its viscosity was again measured. The viscosity of the stored sample was 1.07 times that of the fresh sample. There was little viscosity change, and the storage stability of the coating liquid prepared herein was good.

(5) Production of thermal recording paper:

The undercoat liquid prepared in the above (4) was applied onto one surface of a substrate, base paper (woodfree paper weighing 52 g/m$^2$) with a wire bar coater. Its amount coated was 2 g/m$^2$ in terms of the solid content of the coating liquid. Then, this was dried at 50° C. for 5 minutes. On the other hand, 1 part of the aqueous dispersion A, 4 parts of the aqueous dispersion B, 2 parts of the aqueous dispersion C, and 2 parts of the binder liquid prepared in the above (2) were mixed with stirring them to prepare a coating liquid for a thermo-sensitive coloring layer. This was applied over the under coat layer with a wire bar coater. Its amount coated was 6 g/m$^2$ in terms of the solid content of the coating liquid. Then, this was dried at 50° C. for 5 minutes. The coated surface was calendered with a super calender (under a linear pressure of 30 kg/cm). Next, the surface-protective coat liquid prepared in the above (3) was applied over the thermo-sensitive coloring layer with a wire bar coater. Its amount coated was 3 g/m$^2$ in terms of the solid content of the coating liquid, and 1.9 g/m$^2$ in terms of the total of the solids PVA(A) and TC-310 in the coating liquid. Then, this was dried at 50° C. for 10 minutes. The coated surface was again calendered with a super calender (under a linear pressure of 30 kg/cm). The thus-coated paper is thermal recording paper. While being coated with the overlying layers in the process of producing the thermal recording paper, the thermo-sensitive coloring layer was protected from heat and pressure and therefore did not color. In addition, as in Table 4 below, the water resistance of the thermal recording paper produced herein was good.

Immediately after its production, fresh samples of the thermal recording paper were set in a thermal facsimile printer (Ricoh's Model Rifax 300) and printed. The printed samples were tested and evaluated according to the methods mentioned below. The test data are given in Table 4.

Water resistance:

The printed samples were dipped in distilled water at 30° C. for 24 hours, and evaluated for water resistance in the manner mentioned below.

Print Density:

Before and after dipped, the print density was measured with a Macbeth densitometer (Macbeth's Model RD-514). Based on the density change before and after dipped, the samples were ranked into five ranks, from 1 (the worst) to 5 (the best). The samples having still kept higher print density even after dipped are in higher ranks, and are better.

Wet Rubbing Resistance:

After dipped, the printed and non-printed area of each sample was rubbed with a finger, and the rubbed area was checked as to how and to what degree the printed image was blurred. Based on this, the samples were ranked into five ranks, from 1 (the worst) to 5 (the best). The samples blurred to a smaller degree are in higher ranks, and are better.

Oil Resistance:

Cotton seed oil was applied to the printed samples in an ordinary manner, and left at 20° C. or 40° C. for 24 hours. The print density of the oil-coated samples was compared with that of the non-coated samples. Based on the comparison, the samples were ranked into five ranks, from 1 (the worst) to 5 (the best). The samples having still kept higher print density even after coated with oil are in higher ranks, and are better.

Plasticizer Resistance:

Immediately after produced, the fresh samples were printed, and the printed samples were tested for plasticizer resistance in a polyvinyl chloride film resistance test. Briefly, each printed sample was kept in contact with a soft polyvinyl chloride film containing a plasticizer, at 30° C. and under a load of 300 g/m$^2$ for 24 hours. After the contact test, the print density of the contacted samples was compared with that of the non-contacted samples. Based on the comparison, the samples were ranked into five ranks, from 1 (the worst) to 5 (the best), as in the oil resistance test mentioned above. Examples 2-1 and 3-1

Different types of thermal recording paper were produced in the same manner as in Example 1-1, for which, however, different types of modified PVA as in Table 3 below were used in preparing the coating liquids (for binder, surface-protective layer and undercoat layer). These were tested in the same manner as in Example 1-1. The test data are given in Table 4.

Comparative Example 1-1

A comparative sample of thermal recording paper was produced in the same manner as in Example 1-1, for which, however, a different type of modified PVA as in Table 3 was used in preparing the coating liquids (for binder, surface-protective layer and undercoat layer). This was tested in the same manner as in Example 1-1. The test data are given in Table 4.

TABLE 3

| | Type of PVA in Surface-Protective Layer | | | | Type of PVA in Undercoat Layer | | | | Type of PVA in Binder | | | |
|---|---|---|---|---|---|---|---|---|---|---|---|---|
| | comonomer | degree of comonomer modification (mol %) | degree of hydrolysis (mol %) | degree of polymerization | comonomer | degree of comonomer modification (mol %) | degree of hydrolysis (mol %) | degree of polymerization | comonomer | degree of comonomer modification (mol %) | degree of hydrolysis (mol %) | degree of polymerization |
| Ex. 1-1 | ethylene | 4.5 | 98.4 | 1550 | ethylene | 7.8 | 98.3 | 550 | ethylene | 5.1 | 99.3 | 1550 |
| Ex. 2-1 | ethylene | 4.5 | 98.2 | 1550 | ethylene | 6.4 | 98.5 | 550 | ethylene | 5.1 | 98.5 | 1050 |
| | VMS | 0.2 | | | | | | | | | | |
| Ex. 3-1 | VMS | 0.2 | 98.5 | 1700 | ethylene | 7.8 | 98.3 | 550 | ethylene | 5.1 | 99.3 | 1550 |
| Co. Ex. 1-1 | — | — | 98.4 | 1750 | — | — | 98.5 | 1000 | — | — | 99 | 1750 |

VMS: vinyltrimethoxysilane

TABLE 4

| | Physical Properties of Coating Liquids | | | | | | Physical Properties of Coated Paper | | | | |
|---|---|---|---|---|---|---|---|---|---|---|---|
| | Coating Liquid for Binder | | Coating Liquid for Surface-protective Layer | | Coating Liquid for Undercoat Layer | | Water resistance | | | | |
| | | | | | | | Colorability | | | Oil Resistance | |
| | viscosity (mPa·s) | viscosity increase (times) | viscosity (mPa·s) | viscosity increase (times) | viscosity (mPa·s) | viscosity increase (times) | print density | wet rubbing resistance | Plasticizer Resistance | 20° C. | 40° C. |
| Ex. 1-1 | 850 | 1.1 | 580 | 1.09 | 340 | 1.07 | 5 | 4 | 4 | 5 | 5 |
| Ex. 2-1 | 680 | 1.14 | 620 | 1.09 | 340 | 1.07 | 5 | 5 | 5 | 5 | 5 |
| Ex. 3-1 | 850 | 1.1 | 660 | 1.30 | 340 | 1.07 | 4 | 3 | 4 | 4 | 4 |
| Co. Ex. 1-1 | 890 | 1.05 | 680 | 1.08 | 610 | 1.08 | 3 | 2 | 2 | 2 | 2 |

From the data in Table 4, it is understood that the samples of Examples 1-1 to 3-1 are, though processed at a low temperature of 50° C., all better than the comparative sample of Comparative Example 1-1 with respect to the water resistance, the colorability of printed images (the print density), the plasticizer resistance and the oil resistance. In particular, the sample of Example 2-1 is the best of all.

The following Examples are to demonstrate ink-jet recording materials.

The samples produced in the following Examples were tested according to the ink-jet recording method mentioned below, and their properties were evaluated according to the test methods also mentioned below.

(1) Ink-jet recording method:

Using a recording device (printer) equipped with an on-demand ink-jet head having a jet orifice diameter of 60 μm, the PVA-coated resin sheets produced in the following Examples were printed with the following four types of ink to form color images thereon. The printed images were evaluated according to the test methods mentioned below.

Formulation of Yellow Ink:

| | |
|---|---|
| C.I. Acid Yellow 2.3 | 2 parts |
| Diethylene glycol | 30 parts |
| Water | 70 parts |

Formulation of Magenta Ink:

| | |
|---|---|
| C.I. Acid Red 32 | 2 parts |
| Diethylene glycol | 30 parts |
| Water | 70 parts |

Formulation of Cyan Ink:

| | |
|---|---|
| C.I. Direct Blue 86 | 2 parts |
| Diethylene glycol | 30 parts |
| Water | 70 parts |

Formulation of Black Ink:

| | |
|---|---|
| C.I. Direct Black 19 | 2 parts |
| Diethylene glycol | 30 parts |
| Water | 70 parts |

(2) Ink absorption (ink affinity):

The printed images were rubbed with a finger, and the time taken until the rubbed images showed no change (that is, until the rubbed images were no more blurred) was read. The samples for which the time thus read was shorter absorbed ink more rapidly.

(3) Blur resistance:

The diameter of the printed dots was measured with a stereo-microscope, and compared with the diameter of the ink drops to thereby determine how much and by what times the diameter of the printed dots was larger than that of the ink drops. The samples on which the printed dots were not so much larger than the ink drops applied thereto have better blur resistance.

(4) Water resistance:

Before being printed thereon, the PVA-coated resin sheets were dipped in distilled water at 20° C. for 1 minute, and their surfaces were rubbed with a finger to evaluate the water resistance and the sticking resistance of the sheets.

A: The ink-absorbing layer peeled little. No cobwebbing was seen between the finger and the sheet surface.

B: The ink-absorbing layer peeled a little. Some but a little cobwebbing was seen between the finger and the sheet surface.

C: The ink-absorbing layer peeled much. Much cobwebbing was seen between the finger and the sheet surface. As being too sticky, the finger was difficult to release from the sheet surface.

Example 1-2

Prepared was an aqueous 10% solution (b) of PVA (A) having an ethylene unit content of 4.5 mol %, a degree of hydrolysis in the vinyl ester moiety of 98.4 mol %, and a degree of polymerization of 1550. On the other hand, 100 parts of Mizukasil P-78D (silica powder from Mizusawa Chemical) was well dispersed in 400 parts of water added thereto. To the resulting dispersion being still stirred, gradually added was 200 parts of the aqueous solution (b) at room temperature to prepare an aqueous dispersion of modified PVA with silica. 6 parts of 10% TC-310 (from Matsumoto Pharmaceutical) solution (B) was gradually added to the aqueous dispersion of modified PVA with silica, with stirring at room temperature, and a necessary amount of distilled water was added thereto to prepare a coating liquid having a solid concentration of 16%. In this, the blend ratio of (A)/(B) was 100/3 by weight. Its viscosity was measured with a BL-type viscometer at 30° C. and at 30 rpm, and was 680 mPa·S. After left at 30° C. for 2 weeks, its viscosity was again measured. The viscosity of the stored sample was 1.05 times that of the fresh sample. There was little viscosity change, and the storage stability of the coating liquid prepared herein was good. Next, the PVA-containing coating liquid was applied by hand onto a polyester film having a thickness of 50 $\mu$m and a degree of transparency of 95% thereby to form thereon an ink-absorbing layer. The amount of the coating liquid applied was so controlled that the dry weight of the layer coated could be 15 g/m$^2$ in terms of the total solid content of the liquid, and could be 2.6 g/m$^2$ in terms of the total of the solids PVA(A) and TC-310(B) in the coating liquid. This was dried in a hot air drier at 70° C. for 10 minutes. The thus-coated film is a recording sheet for ink-jet recording systems. This was tested for its properties, and the test data obtained are given in Table 6.

Examples 2-2 and 3-2

Different types of ink-jet recording materials (sheets) were produced in the same manner as in Example 1-2, for which, however, PVA and the ratio of (A)/(B) in preparing the coating liquids were varied as in Table 5 below. These were tested in the same manner as in Example 1-2, and the test data obtained are given in Table 6.

TABLE 5

| | Type of Comonomer | Degree of Modification (mol %) | Degree of Polymerization | Degree of Hydrolysis (mol %) | Blend Ratio (A)/(B) by weight |
|---|---|---|---|---|---|
| Example 1-2 | ethylene | 4.5 | 1550 | 98.4 | 100/3 |
| Example 2-2 | ethylene | 5.1 | 1550 | 98.5 | 100/3 |
| | VMS[1)] | 0.2 | | | |
| Example 3-2 | VMS | 0.2 | 1700 | 98.5 | 100/3 |
| Comp. Ex. 1-2 | None | — | 1750 | 98.5 | 100/0 |

[1)]VMS: vinyltrimethoxysilane

Comparative Example 1-2

A comparative sample of ink-jet recording material was produced in the same manner as in Example 1-2, for which, however, PVA and the ratio of (A)/ (B) in preparing the coating liquid were varied as in Table 5. This was tested in the same manner as in Example 1-2, and the test data obtained are given in Table 6.

From the data in Table 6, it is understood that the samples of Examples 1-2 to 3-2 are, though processed at a low temperature of 70° C., all better than the comparative sample of Comparative Example 1-2 with respect to the water resistance, the ink absorption and the blur resistance. In particular, the sample of Example 2-2 is the best of all.

TABLE 6

| | Ink Absorption (sec) | Blur Resistance (times) | Water resistance |
|---|---|---|---|
| Example 1-2 | 5 | 1.8 | B |
| Example 2-2 | 3 | 1.5 | A |
| Example 3-2 | 6 | 2.0 | B |
| Comp. Ex. 1-2 | 8 | 2.3 | C |

While the invention has been described in detail and with reference to specific embodiments thereof, it will be apparent to one skilled in the art that various changes and modifications can be made therein without departing from the spirit and scope thereof.

What is claimed is:

1. A water resistant composition comprising a uniform mixture of (A) at least one selected from modified polyvinyl alcohol containing from 1 to 20 mol % of $\alpha$-olefin units with not more than 4 carbon atoms, modified polyvinyl alcohol containing from 0.01 to 1 mol % of silyl groups, and modified polyvinyl alcohol containing from 1 to 20 mol % of $\alpha$-olefin units with not more than 4 carbon atoms and from 0.01 to 1 mol % of silyl groups and (B) an organotitanium compound having a chelating ligand, wherein the blend ratio of the component (A) to the component (B), (A)/(B) falls between 99.99/0.01 and 60/40 by weight.

2. The water resistant composition as claimed in claim 1, wherein the component (A) is modified polyvinyl alcohol containing from 1 to 20 mol % of $\alpha$-olefin units with not more than 4 carbon atoms and from 0.01 to 1 mol % of silyl groups.

3. The water resistant composition as claimed in claim 1, wherein the $\alpha$-olefin units with not more than 4 carbon atoms are ethylene units.

4. The water resistant composition as claimed in claim 1, wherein the chelating ligand-having organotitanium compound (B) is at least one selected from titanium lactate and its partially or fully neutralized salts.

5. A coating agent comprising the water resistant composition of claim 1.

6. A thermal recording material having a coat layer of the water resistant composition of claim 1.

7. A thermal recording material having an overcoat layer of the water resistant composition of claim 1.

8. A recording material having an ink-absorbing layer of the composition of claim 1.

9. An ink-jet recording material having an ink-absorbing layer of the composition of claim 1.

10. The recording material as claimed in claim 8, wherein the absorbent layer is a coat layer.

11. The ink-jet recording material as claimed in claim 9, wherein the absorbent layer is a coat layer.

* * * * *

UNITED STATES PATENT AND TRADEMARK OFFICE

CERTIFICATE OF CORRECTION

PATENT NO. : 6,346,570 B1
DATED : February 12, 2002
INVENTOR(S) : Somemiya et al.

It is certified that error appears in the above-identified patent and that said Letters Patent is hereby corrected as shown below:

Title page,
Item [12], should read -- [12] United States Patent
Somemiya et al. --
Item [75], the Inventors' information should read:
-- [75] Inventors: Kazuyuki Somemiya; Sadahiko Shiraga; Naoki Fujiwara; Atsushi Jikihara; Toshiyuki Akasawa, all of Kurashiki (JP) --

Signed and Sealed this

Third Day of September, 2002

*Attest:*

JAMES E. ROGAN

*Attesting Officer* *Director of the United States Patent and Trademark Office*